United States Patent
Litvin et al.

(10) Patent No.: US 9,535,186 B2
(45) Date of Patent: Jan. 3, 2017

(54) PROJECTION IMAGE GENERATION VIA COMPUTED TOMOGRAPHY SYSTEM

(71) Applicant: ANALOGIC CORPORATION, Peabody, MA (US)

(72) Inventors: Andrew Litvin, Stoneham, MA (US); Ram Naidu, Newton, MA (US); Sergey Simanovsky, Brookline, MA (US)

(73) Assignee: ANALOGIC CORPORATION, Peabody, MA (US)

( * ) Notice: Subject to any disclaimer, the term of this patent is extended or adjusted under 35 U.S.C. 154(b) by 0 days.

(21) Appl. No.: 14/901,531

(22) PCT Filed: Jun. 25, 2013

(86) PCT No.: PCT/US2013/047584
§ 371 (c)(1),
(2) Date: Dec. 28, 2015

(87) PCT Pub. No.: WO2014/209281
PCT Pub. Date: Dec. 31, 2014

(65) Prior Publication Data
US 2016/0154136 A1    Jun. 2, 2016

(51) Int. Cl.
*G06K 9/00* (2006.01)
*G01V 5/00* (2006.01)
*G06T 11/00* (2006.01)

(52) U.S. Cl.
CPC ............ *G01V 5/005* (2013.01); *G01V 5/0066* (2013.01); *G06T 11/005* (2013.01)

(58) Field of Classification Search
CPC ...... G01V 5/0066; G01V 5/005; A61B 6/4452; A61B 6/025; A61B 6/027; A61B 7/032; G01T 1/244; G01T 1/2985; G01T 1/2018
(Continued)

(56) References Cited

U.S. PATENT DOCUMENTS 5,706,325 A * 1/1998 Hu .................. A61B 6/032 378/146
7,016,457 B1 * 3/2006 Senzig .............. A61B 6/032 378/116
(Continued)

OTHER PUBLICATIONS

International Search Report cited in related application No. PCT/US13/47584 dated Mar. 4, 2014, pp. 9.
(Continued)

*Primary Examiner* — Ali Bayat
(74) *Attorney, Agent, or Firm* — Cooper Legal Group, LLC

(57) ABSTRACT

Among other things, computed tomography (CT) systems and/or techniques for generating projections images of an object(s) under examination via a CT system are provided. A surface about which the projection image is focused is defined and data yielded from vertical rays of radiation intersecting the surface and data yielded from non-vertical rays intersecting the surface are used to generate the projection image. In some embodiments, the projection image is assembled from one or more projection lines, which are respectively associated with a line-path contacting the surface and extend in a direction parallel to an axis of rotation for a radiation source. A projection line is indicative of a degree of attenuation experienced by rays intersecting a line-path associated with the projection line and emitted while the radiation source was at a particular segment of a radiation source trajectory.

19 Claims, 8 Drawing Sheets

(58) Field of Classification Search
USPC .......................................................... 382/131
See application file for complete search history.

(56) References Cited

U.S. PATENT DOCUMENTS

| | | | | |
|---|---|---|---|---|
| 2007/0140414 A1* | 6/2007 | Garms | ................. | G01T 1/2985 |
| | | | | 378/19 |
| 2007/0140415 A1* | 6/2007 | Garms | ................. | G01T 1/2985 |
| | | | | 378/19 |
| 2007/0230657 A1* | 10/2007 | Garms | ................. | G01N 23/046 |
| | | | | 378/57 |
| 2008/0267484 A1* | 10/2008 | Chen | ...................... | A61B 6/032 |
| | | | | 382/132 |
| 2012/0177273 A1 | 7/2012 | Naidu et al. | | |

OTHER PUBLICATIONS

First Chinese Office Action Chinese Application No. 201380079071.9 dated Oct. 10, 2016, 3 pgs.

* cited by examiner

PROJECTION IMAGE GENERATION VIA COMPUTED TOMOGRAPHY SYSTEM

BACKGROUND

The present application relates to radiation systems. It finds particular application in the context of security imaging, where it may be desirable to display high resolution projection images representative of an object to security personnel while utilizing volumetric data representative of the object for automated threat detection. However, it may also find applicability in medical fields, industrial fields, and/or other fields where radiation systems are employed to examine/image an object.

Today, radiation imaging systems such as computed tomography (CT) systems, single-photon emission computed tomography (SPECT) systems, digital projection systems, and/or line-scan systems, for example, are useful to provide information, or images, of interior aspects of an object under examination. The object is exposed to rays of radiation photons (e.g., x-ray photons, gamma ray photons, etc.) and radiation photons traversing the object are detected by a detector array positioned substantially diametrical opposite the radiation source relative to the object. A degree to which the radiation photons are attenuated by the object (e.g., absorbed, reflected, etc.) is measured to determine one or more properties of the object, or rather aspects of the object. For example, highly dense aspects of an object typically attenuate more radiation than less dense aspects, and thus an aspect having a higher density, such as a bone or metal, for example, may be apparent when surrounded by less dense aspects, such as muscle or clothing.

Radiation imaging systems are utilized in a variety of fields to image/examine aspects of an object not readily visible to the naked eye. For example, radiation imaging systems are used in security applications to identify potential threat items, including weapons and/or explosives, concealed within a suitcase or other object, for example.

Two of the more common types of radiation imaging systems used in security applications are CT systems and line-scan systems. Line-scan systems are configured to view the object from a limited number of view-angles (e.g., typically 1 view-angle) and generate projection images (e.g., two-dimensional (2D) images) respectively representing a collapsed or flattened, 2D view of the object (e.g., where the densities of aspects of an object through a line in which radiation travels are integrated and represented as a single point on the 2D image). Such systems are particularly valuable for generating high resolution 2D images for display to security personnel responsible for identifying potential threat objects.

CT systems are configured to view an object from a greater number of view-angles than line-scan systems and to generate volumetric data representative of the object. In this way, a three-dimensional (3D) image of the object can be created and properties of respective aspects within the object, such as density information, z-effective information, shape characteristics, etc. can be determined. Using one or more of these properties, automated threat analysis can be performed to determine if the object is a potential threat item. Moreover, 2D projection images or 3D volumetric images can be obtained from CT systems that are representative of the object (e.g., although typically such images are of a lower resolution than the projection images generated by line-scan systems due to, among other things, differences in the resolution of CT detector arrays relative to detector arrays utilized in line-scan systems).

While automatic threat analysis algorithms have proven useful to identify potential threat items, it is sometimes desirable for a security screener to view images of the objects or aspects concealed therein. Accordingly, the resolution of images produced by a radiation imaging system is sometimes an important consideration when selecting whether to implement a line-scan system or a CT system in an environment.

SUMMARY

Aspects of the present application address the above matters, and others. According to one aspect, a method for generating a projection image from volumetric computed tomography (CT) data is provided. The method comprises helically examining an object via radiation, such that a radiation source and a detector array rotate within a plane about an axis of rotation while varying, along the axis of rotation, a relative position between the plane and the object. The method also comprises defining a surface about which the projection image is focused and, for a first view-angle, identifying first data generated by a first detector cell of the detector array corresponding to a first ray intersecting a first line-path spatially coincident with the surface. The method further comprises, for a second view-angle, identifying second data generated by a second detector cell of the detector array corresponding to a second ray intersecting the first line-path. The first detector cell and second detector cell are comprised within a first row of detector cells, which extends in a direction substantially perpendicular to the axis of rotation. The method also comprises using the first data and the second data to generate the projection image.

According to another aspect, a computed tomography (CT) system configured to helically examine an object by rotating a radiation source and a detector array in a plane about an axis of rotation while varying a relative position between the object and the plane in a direction substantially parallel to the axis of rotation is provided. The CT system comprises a surface defining component configured to define a surface about which a projection image is focused and a view interval selection component configured to generate a first projection line. The generating comprises, for a first view-angle, identifying first data generated by a first detector cell of the detector array corresponding to a first ray intersecting a first line-path spatially coincident with the surface. The generating also comprises, for a second view-angle, identifying second data generated by a second detector cell of the detector array corresponding to a second ray intersecting the first line-path. The first detector cell and second detector cell are comprised within a first row of detector cells, which extends in a direction substantially perpendicular to the axis of rotation. The CT system also comprises an image construction component configured to generate the projection image using the first projection line.

According to another aspect, a computed tomography (CT) system is provided. The CT system comprises an image generator configured to generate a projection image of an object under examination using data yielded from vertical rays of radiation intersecting a surface about which the projection image is focused and data yielded from non-vertical rays intersecting the surface about which the projection image is focused.

Those of ordinary skill in the art may appreciate still other aspects of the present application upon reading and understanding the appended description.

FIGURES

The application is illustrated by way of example and not limitation in the figures of the accompanying drawings, in which like references generally indicate like elements and in which.

DESCRIPTION

Figure 1:
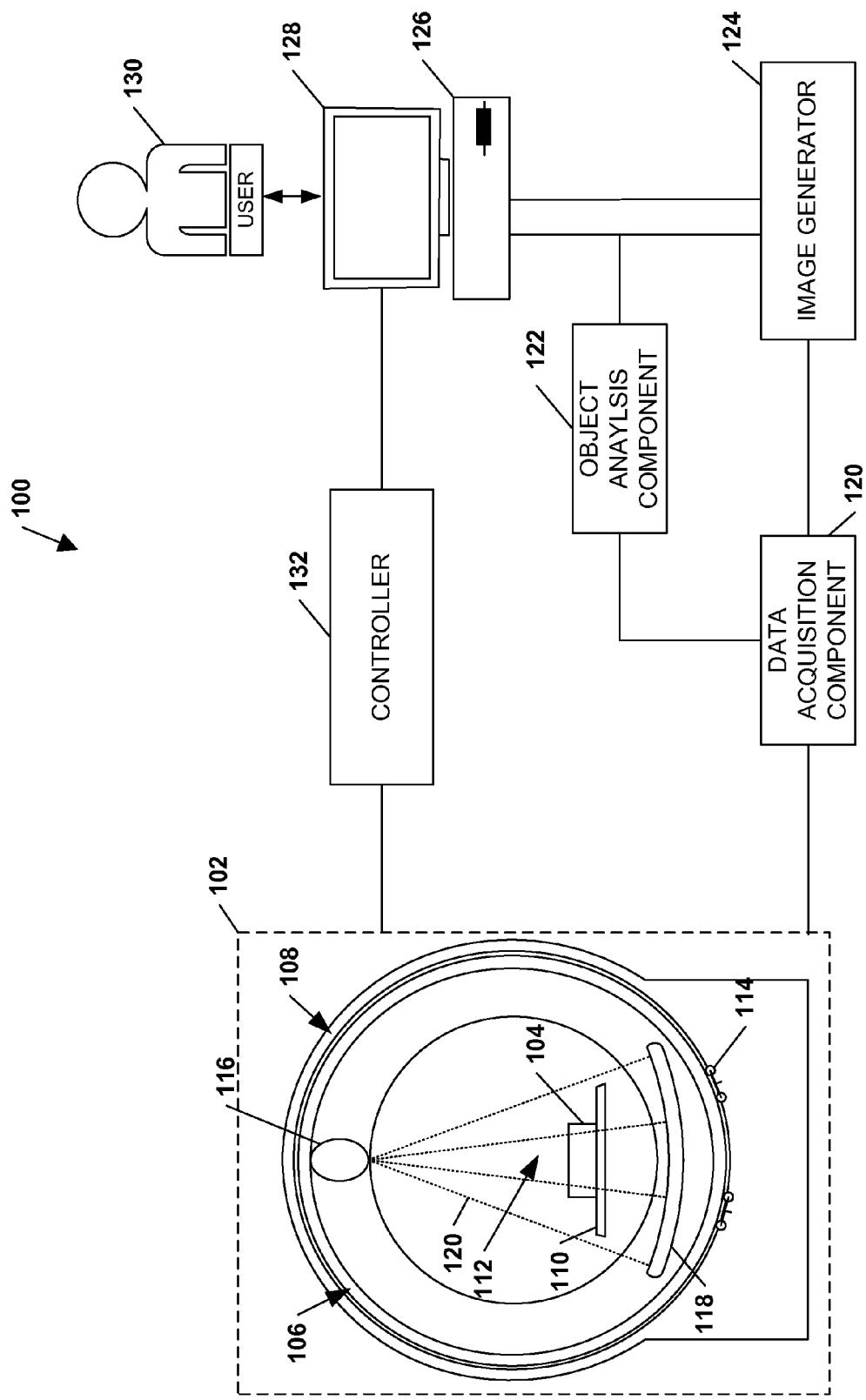
FIG. 1 is a schematic block diagram illustrating an example environment where a CT system such as described herein may be implemented.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

The present disclosure relates to a computed tomography (CT) system, such as may be employed in security applications for threat-detection. The CT system is configured to generate volumetric data, indicative of an object under examination, from which 2D projection images and/or 3D volumetric images the object can be generated. In some embodiments, projection images resulting from the examination of an object are of a higher resolution than conventionally attainable via CT systems. For example, the CT system may be configured to generate projection images having a spatial frequency of at least 2.5 line pairs per centimeter (2.5 LP/cm).

As provided herein, an object to be examined by the CT system is inserted into the CT system and is helically examined (e.g., by rotating the radiation source and detector array in an x,y plane about an axis of rotation extending in a z-direction while translating the object in the z-direction). In this way, the object is viewed from a plurality of view-angles to generate volumetric data indicative of the object.

To generate the projection image from the volumetric data, a surface is defined. The surface describes a, topological manifold about which the projection image is focused. Thus, aspects of the object contacting the surface may be in-focus in the projection image while aspects of the object more distant from the surface may appear out of focus (e.g., may appear more blurry and/or jagged). In some embodiments, the surface extends (e.g., to some degree) in a direction parallel to the axis of rotation (e.g., extending in the z-direction).

The surface may be arbitrarily defined or may be defined based upon information known about the object. By way of example, using an automated threat detection system, a region of interest (e.g., gun, sheet explosive, etc.) within the object may be identified, and a surface may be defined based upon the region of interest (e.g., to at least partially include the region of interest). The surface may be statically defined for respective objects undergoing examination or may be dynamically defined on an object-by-object or aspect-by-aspect basis, for example. Moreover, in some embodiments, multiple projection images representing a same object may be generated by defining multiple surfaces.

Data corresponding to a defined set of rays is used to generate a set of projection lines for the surface, which are then assembled to generate a projection image. Such rays may include both vertical rays and non-vertical rays (e.g., relative to the detector array). Respective projection lines represent the attenuation of a set of rays intersecting a particular line-path (e.g., which may be linear or non-linear). In some embodiments, the line-path extends parallel to the axis of rotation and is spatially coincident with the surface. For example, a first projection line may represent the attenuation of a first set of rays intersecting a first line-path and a second projection line may represent the attenuation of a second set of rays intersecting a second line-path, substantially parallel to the first line-path. One or more properties of a projection image, such as an intensity of respective image pixels, may be determined based upon the attenuation represented by respective projection lines. Further, the data represented by the projection lines may be binned according to various binning schemes to adjust a resolution of the projection image and/or a pixel size of image pixels of the projection image.

Defining a set of rays that are of interest for a particular projection line may follow a procedure similar to the following procedure. A view-angle at which the radiation source emits vertical rays intersecting a line-path associated with the particular projection line is determined. This view-angle may be referred to as a vertical view-angle because vertical rays intersecting the line-path are emitted while the radiation source is at this particular view-angle relative to the object. Next, a desired segment of the radiation sources' trajectory is defined for the line-path based upon the vertical view-angle. The segment defines which view-angles are of interest for the line-path and is typically centered at the vertical view-angle. For example, the source trajectory segment may include view-angles that are +/−5 degrees relative to the vertical view-angle.

For respective view-angles within the segment, the trajectory of rays intersecting the line-path and impinging respective rows of detector cells is determined. For example, at a first view-angle within the source trajectory segment, the trajectory of a first ray intersecting the line-path and impinging a first row of detector cells is determined and the trajectory of a second ray intersecting the line-path and impinging a second row of detector cells is determined. Similarly, at a second view-angle within the source trajectory segment, the trajectory of a third ray intersecting the line-path and impinging the first row of detector cells is determined and the trajectory of a fourth ray intersecting the line-path and impinging the second row of detector cells is determined. Accordingly, for respective view-angles within the segment, the trajectory of a ray impinging each of a plurality of detector rows is determined. Stated differently, for respective detector rows, the trajectory of a ray at each of a plurality of view-angles included within the segment is determined. Using these trajectories, data corresponding to such rays can be assembled to develop a projection line for the line-path.

FIG. 1 illustrates an example environment 100 of a CT system as provided for herein. It may be appreciated that the environment 100 merely provides an example arrangement and is not intended to be interpreted in a limiting manner, such as necessarily specifying the location, inclusion, and/or relative position of the components depicted therein. By way of example, in some embodiments, the data acquisition component 120 is part of the detector array 118 and/or is located on a rotating gantry portion of the CT system.

In the example environment 100, an examination unit 102 of the radiation system is configured to examine objects 104. The examination unit 102 comprises a rotating gantry 106 and a (stationary) support structure 108 (e.g., which may encase and/or surround at least a portion of the rotating gantry 106 (e.g., as illustrated with an outer, stationary ring, surrounding an outside edge of an inner, rotating ring)). During an examination of an object 104, the object 104 is placed on a support article 110, such as a bed or conveyor belt, for example, that is translated through an examination region 112 (e.g., a hollow bore in the rotating gantry 106), where the object 104 is exposed to radiation 120.

The rotating gantry 106 may surround a portion of the examination region 112 and may comprise a radiation source 116 (e.g., an ionizing radiation source such as an x-ray source or gamma-ray source) and a detector array 118. The detector array 118 is typically mounted on a substantially diametrically opposite side of the rotating gantry 106 relative to the radiation source 116, and during an examination of the object 104, the rotating gantry (e.g., including the radiation source 116 and detector array 118) are rotated about the object 104. As will be further described with respect to FIG. 2, such rotation of the rotating gantry 106 in combination with the translation of the object 104 through the examination region 112 causes the object to be helically examined. Because the radiation source 116 and the detector array 118 are mounted to a same rotating gantry 106, a relative position between the detector array 118 and the radiation source 116 is substantially maintained during the rotation of the rotating gantry 106.

During the examination of the object 104, the radiation source 116 emits cone-beam, fan-beam, and/or other shaped radiation configurations from a focal spot of the radiation source 116 (e.g., a region within the radiation source 116 from which radiation 120 emanates) into the examination region 112. Such radiation 120 may be emitted substantially continuously and/or may be emitted intermittently (e.g., a brief pulse of radiation 120 is emitted followed by a resting period during which the radiation source 116 is not activated). Further, the radiation 120 may be emitted at a single energy spectrum or multi-energy spectrums depending upon, among other things, whether the CT system is configured as a single-energy CT system or a multi-energy (e.g., dual-energy) CT system.

As the emitted radiation 120 traverses the object 104, the radiation 120 may be attenuated differently by different aspects of the object 104. Because different aspects attenuate different percentages of the radiation 120, the number of photons detected by the respective detector cells of the detector array 118 may vary. For example, more dense aspects of the object(s) 104, such as a bone or metal plate, may attenuate more of the radiation 120 (e.g., causing fewer photons to impinge upon a region of the detector array 118 shadowed by the more dense aspects) than less dense aspects, such as skin or clothing.

Radiation detected by the detector array 118 may be directly converted and/or indirectly converted into analog signals that can be transmitted from the detector array 118 to a data acquisition component 120 operably coupled to the detector array 118. The analog signal(s) may carry information indicative of the radiation detected by the detector array 118 (e.g., such as an amount of charge measured over a sampling period and/or an energy level of detected radiation). The data acquisition component 120 is configured to convert the analog signals output by the detector array 118 into digital signals and/or to compile signals that were transmitted within a predetermined time interval, or measurement interval, using various techniques (e.g., integration, photon counting, etc.). The compiled signals are typically in projection space and are, at times, referred to as projections. A projection may be representative of the information collected or measurements acquired by respective detector cells of the detector array 118 during a particular interval of time or view, where a view corresponds to data collected while the radiation source 160 was at a particular view-angle relative to the object 104.

The projections generated by the data acquisition component 120 may be transmitted to an object analysis component 122 configured to assemble two or more projections to generate a volumetric representation of the object 104 in projection space and/or in image space (e.g., where the projections are converted to image space by reconstructing the projections via analytic, iterative, or other reconstruction techniques (e.g., tomosynthesis reconstruction, backprojection, etc.)). In this way, volumetric data indicative of the object 104 is yielded from the examination.

In some embodiments, the object analysis component 122 is further configured to utilize the volumetric data (e.g., in projection space and/or image space) to determine or estimate one or more properties of items within the object 104. By way of example, in a security environment, the object analysis component 122 (e.g., at times referred to as an automated threat detection system) may be configured to approximate, among other things, density information, z-effective information, and/or shape characteristics of various items within the object (e.g., a suitcase, bag, etc.). Using such information and/or characteristics, the object analysis component 122 may determine if the object 104 comprises a potential threat item (e.g., such as a weapon and/or explosive), which may be flagged for further inspection. For example, the object analysis component 122 may compare the approximated densities or other properties of respective items to a list of known properties for threat items. If one or more of the approximated densities corresponds to (e.g., matches within a specified deviation) a density on the list, the object analysis component 122 may alert security personnel of the correspondence and/or alert an image generator of the potential identification, for example.

The example CT system further comprises an image generator 124 configured to generate one or more 2D projection images of the object 104 using the projections yielded from the data acquisition component 120 and/or information provided by the object analysis component 122.

As will be described in more detail below, to generate a projection image, a surface is defined about which the projection image is to be focused. The surface may be planar or non-planar and, in some embodiments, extends (e.g., to some degree) in a direction parallel to the axis of rotation (e.g., the surface has a z-component and extends in a z-direction parallel to a direction of travel of the object through the examination region). Moreover, the surface may be user-defined or may be defined as a function of information provided by the object analysis component 122. By way of example, in some embodiments, the image generator 124 may define a surface to include a portion of the object 104 identified as a potential threat item by the object analysis component 122.

Data yielded from a plurality of views is sampled to determine one or more properties of the projection image (e.g., such as an intensity of respective pixels). The data utilized to generate the projection image corresponds to vertical rays and non-vertical rays passing through line-paths spatially coincident with the surface and extending (e.g., to some degree) in a direction parallel to the axis of rotation. For example, a first set of data may correspond to a first vertical ray and a first set of non-vertical rays passing through a first segment of a first line-path and impingent upon a first row of detector cells. A second set of data may correspond to a second vertical ray and a second set of non-vertical rays passing through a second segment of the first line-path and impingement upon a second row of detector cells. A third set of data may correspond to a third vertical ray and a third set of non-vertical rays passing through a first segment of a second line-path and impingement upon the first row of detector cells. A fourth set of data may correspond to a fourth vertical ray and a fourth set of non-vertical rays passing through a second segment of a second line-path and impingement upon the second row of detector cells.

Figure 6:
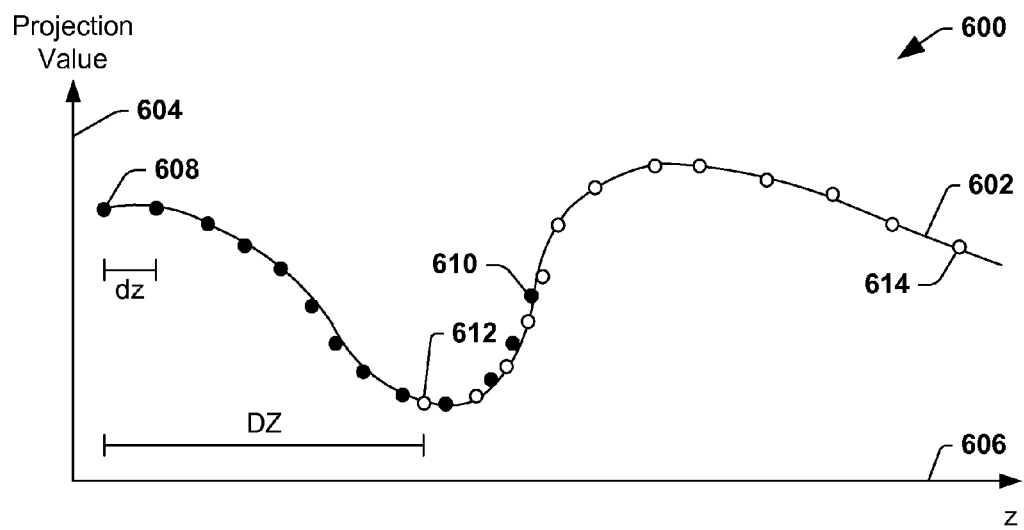
FIG. 6 is a graph of an example projection line.
Figure 7:
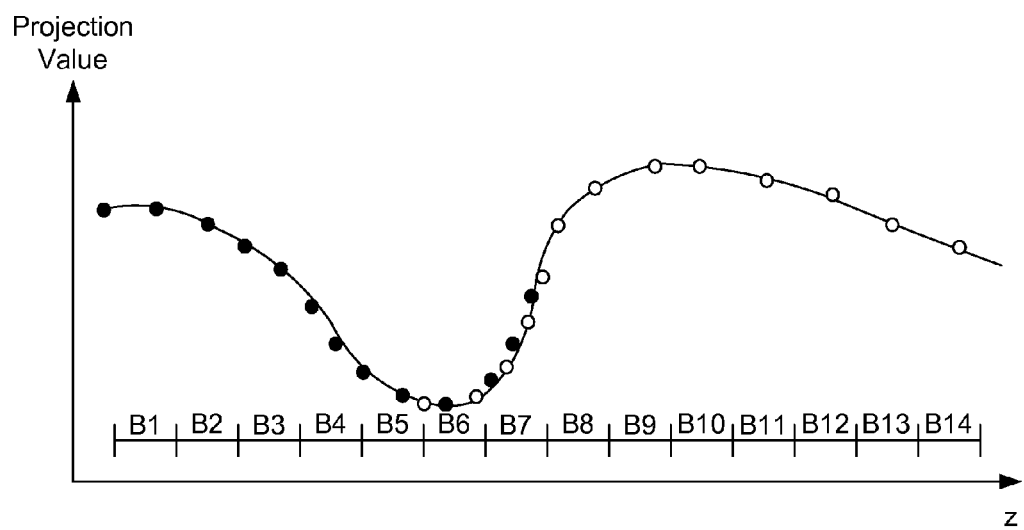
FIG. 7 is a graph of an example projection line.

As will be further described with respect to FIG. 6-7, in this way, the image generator 124 takes advantage of the high spatial sampling frequency in the z-direction, which is provided by the typically slow motion of the object's translation in the z-direction relative to the faster rotation of the rotating gantry 106 in an x,y plane. That is, due to the slow movement of the object 104 in the z-direction relative to the faster movement of the rotating gantry 106 in the x,y plane, data can be acquired from multiple view-angles which correspond to rays intersecting the line-path and impinging upon a same row of detector cells.

The example environment 100 further comprises a terminal 126, or workstation (e.g., a computer), that may be configured to receive a projection image(s) indicative of the object 104 (e.g., output by the image generator 124) and/or to receive information related to whether the object 104 comprises an item of potential interest, for example (e.g., output from the object analysis component 122). At least some of the received information/images may be provided by the terminal 126 for display on a monitor 128 to a user 130 (e.g., security personnel, medical personnel, etc.). In this way, the user 130 can inspect the image(s) to identify areas of interest within the object 104 while also being provided information regarding potential items of interest that have been identified via an automated process, for example. The terminal 126 can also be configured to receive user input which can direct operations of the object examination unit 102 (e.g., a speed to rotate, a speed and direction of a support article 110, etc.), for example.

In the example environment 100, a controller 132 is operably coupled to the terminal 126. The controller 132 may be configured to control operations of the examination unit 102, for example. By way of example, in one embodiment, the controller 132 may be configured to receive information from the terminal 126 and to issue instructions to the examination unit 102 indicative of the received information (e.g., adjust a speed of a conveyor belt).

Figure 2:
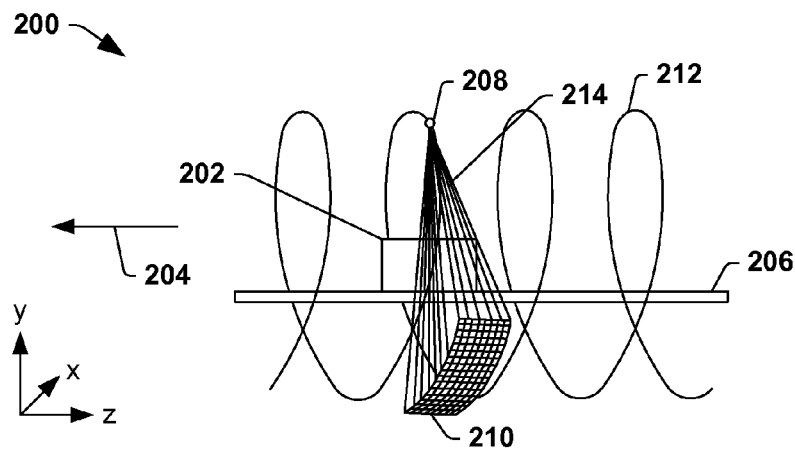
FIG. 2 is a functional diagram illustrating a helical examination performed via a CT system.

FIG. 2 is a functional diagram 200 of a helical examination performed via a CT system, such as in security applications and/or medical applications, for example. In such a system, an object 202 (e.g., 104 in FIG. 1) under examination is translated 204 in a direction parallel to an axis of rotation (e.g., along a z-axis), via a support article 206 (e.g., 110 in FIG. 1). The object 202 is exposed to radiation 214 (e.g., 120 in FIG. 1) while the object 202 is being translated. That is, one or more radiation sources 208 (e.g., 116 in FIG. 1) are configured to emit radiation 214, causing the object 202 to be exposed to radiation 214. A detector array 210 (e.g., 118 in FIG. 1), mounted on a substantially diametrically opposite side of the object 202 relative to the radiation source(s) 208, is configured to detect radiation 214 that has traversed the object 202. In this way, by emitting and detecting radiation 214, the object 202 is examined.

In a CT system, the radiation source(s) 208 and the detector array 210 are typically rotated about the object 202 in a plane (e.g., typically defined as an x-y plane) via a rotating gantry (e.g., 106 in FIG. 1) during the examination. In this way, the radiation source 208 views the object 202 from a plurality of view-angles to develop volumetric data regarding the object 202. Further, in an environment where the object 202 is translated in the z-direction, such a rotation may cause the radiation source(s) 208 and/or the detector array 210 to follow a spiral or helical-like trajectory 212 relative to the object (e.g., where the radiation source(s) 208 and detector array 210 do not move in the z-direction, and thus the helical trajectory is established by the combination of the x,y rotation of the radiation source(s) 208 and detector array 210 and the z-direction translation 204 of the object 202).

Figure 3:
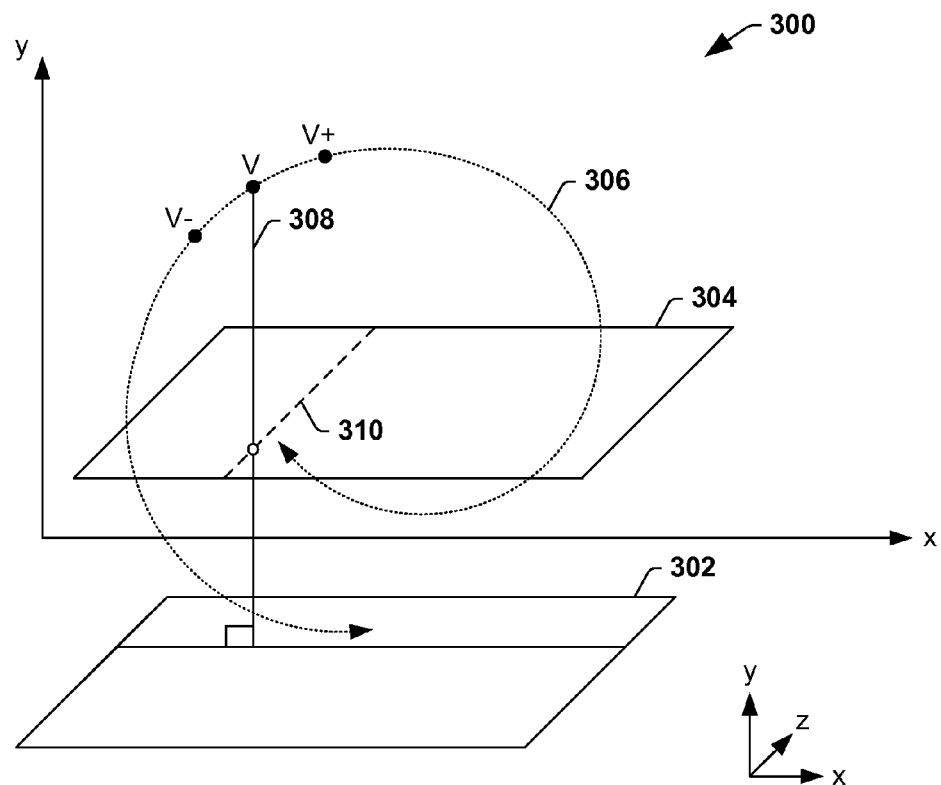
FIG. 3 is a functional diagram illustrating a helical examination performed via a CT system.

FIG. 3 illustrates a two-dimensional function diagram 300 further describing the trajectory of a radiation source (e.g., 208 in FIG. 2) and a detector array 302 (e.g., 210 in FIG. 2). The detector array 302 and radiation source rotate in an x,y plane about an object 304 under examination while the object 304 is translated in a z-direction (e.g., perpendicular to the x,y plane), causing the radiation source and the detector array 302 to follow a helical-like trajectory 306. The black dots along the helical-like trajectory 306 represent the radiation source at various times during the examination and correspond to different view-angles. For example, V− may represent the radiation source at a first view-angle, V may represent the radiation source at a second view-angle, and V+ may represent the radiation source at a third view-angle. Data generated while the radiation source is at the first view-angle may be compiled into a first view, data generated while the radiation source is at the second view-angle may be compiled into a second view, etc.

In this diagram 300, the detector array 302 (e.g., 210 in FIG. 2) is illustrated as being planar. However, it may be appreciated that in some embodiments, a detector array of a CT system is substantially arcuate in shape as illustrated in FIGS. 1 and 2. Further, it may be appreciated that although the object 304 is represented as a planar surface, the object 304 may be three-dimensional.

A detection surface of the detector array 302 generally extends in the x-direction and the z-direction, where the z-direction is typically a direction in which the object is translated. The detector array 302 generally comprises detector cells arranged in columns and rows. A row of detectors cells generally extends in the x-direction and a column of detector cells generally extends in the z-direction. Typically, a distance that the object is translated between two adjacent views is less than the row pitch (e.g., where row pitch is defined as the distance from a center of a first row to a center of an adjacent row). By way of example, in one embodiment, the distance that the object is translated between two adjacent views is approximately 5% of the row pitch. Accordingly, a point in the object shadows a same row of detector cells for approximately 20 views. It is to be appreciated, however, that this is merely a non-limiting example.

A vertical ray is generally defined as a ray which passes through a line-path extending (e.g., to some degree) in a direction parallel to the axis of rotation and intersects the detector array 302 at a perpendicular angle relative to the x-direction. For example, a first vertical ray 308, emitted while the radiation source is at the view-angle labeled V, intersects a first line-path 310 and impinges the detector array 302 at a perpendicular angle (e.g., 90 degrees) relative to the x-direction. It is to be appreciated that when the radiation source is at other view-angles, such as V− and V+, no rays are emitted which intersect the first line-path 310 and impinge the detector array 302 at a perpendicular angle relative to the x-direction.

Figure 4:
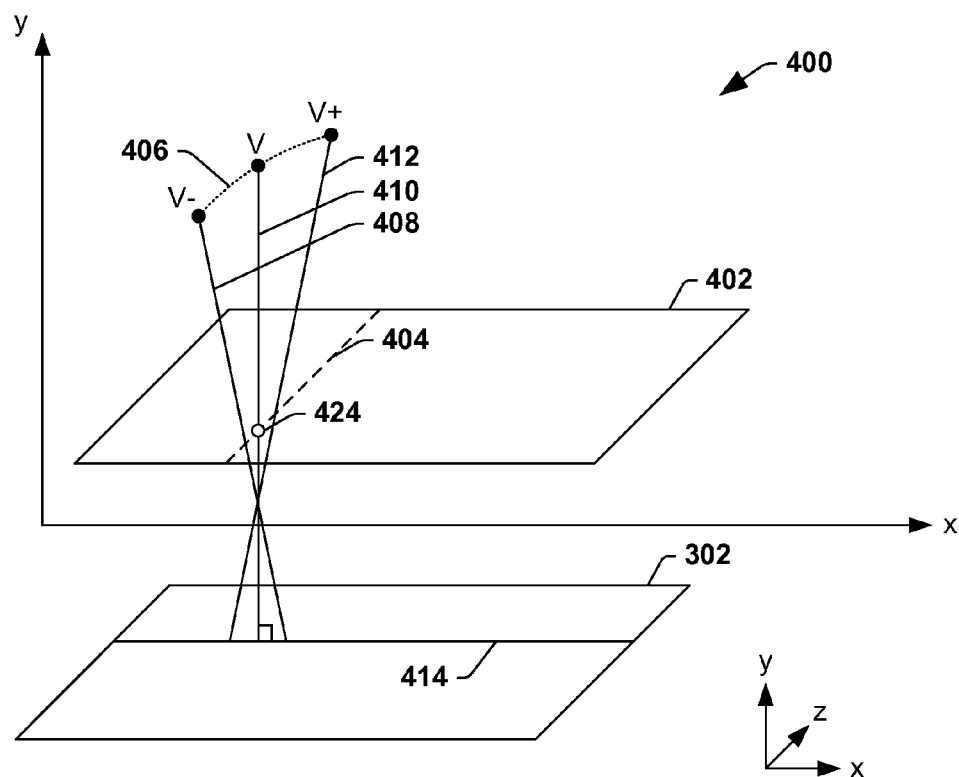
FIG. 4 is a function diagram illustrating selection of data yielded from a detector array for consideration when generating a projection image.
Figure 5:
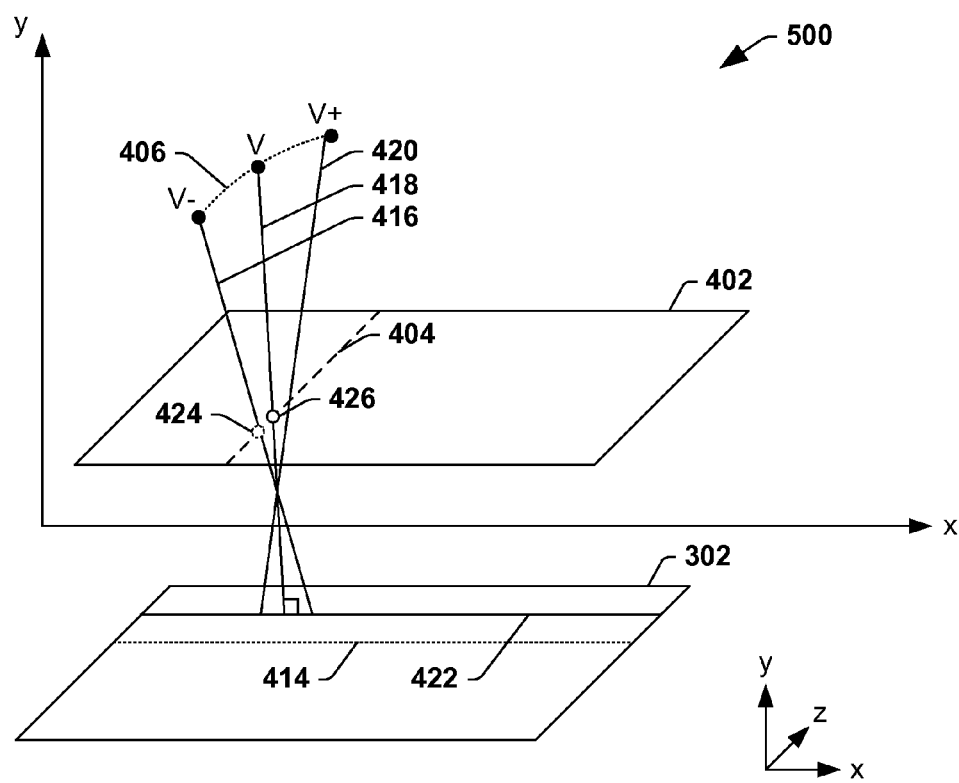
FIG. 5 is a function diagram illustrating selection of data yielded from a detector array for consideration when generating a projection image.

Turning to FIGS. 4 and 5, function diagrams 400 and 500 illustrate how data yielded from the detector array 302 is selected for consideration when generating a projection image. Initially, a surface 402 about which the projection image is focused is defined. In some embodiments, the surface 402 extends in a direction parallel to the axis of rotation (e.g., parallel to a z-axis) and lies within an x,z plane. In other embodiments, the surface 402 may be non-planar and/or may lie within a different plane (e.g., such as a y,z plane). In some embodiments, the surface 402 lies within an object under examination. In other embodiments, the surface 402 may not lie within the object. For example, the surface 402 may be spatially coincident with a support article (e.g., 110 in FIG. 1) translating the object.

Next, data is identified for generating projection lines (e.g., illustrated in FIG. 6) focused at the surface 402. A projection line describes a degree of attenuation experienced by rays represented by the projection line. By defining a focus of the projection lines (e.g., and thus a focus of the projection image) data corresponding to rays that diverge when moving away from the surface 402 (e.g., and that merely converge at the surface 402) can be considered when generating a projection line and/or when generating a projection image.

Respective projection lines represent the attenuation experienced by at least some rays intersecting a line-path through the surface 402. Such a line-path may be linear or non-linear (e.g., to follow the linearity or non-linearity of the surface) and, in some embodiments, extends (e.g., to some degree) in a direction parallel to the axis of rotation (e.g., parallel to a z-axis). For example, a first projection line is associated with a first line-path 404 and represents the attenuation of rays intersecting the first line-path 404 and emitted during a first segment of the radiation source's trajectory. A second projection line is associated with a second line-path (not shown) and represents the attenuation of rays intersecting the second line-path and emitted during a second segment of the radiation source's trajectory.

The following description describes how a first projection line, associated with the first line-path 404, can be generated using data indicative of rays emitting during a first segment of the radiation source's trajectory (e.g., from V− to V+). It may be appreciated that a similar technique may apply to generate a second projection line associated with a second line-path, a third projection line associated with a third line-path, etc.

Initially, a view-angle that emits vertical rays intersecting the first line-path 404 is identified. For example, in the illustrated embodiment, the view-angle labeled V may produce vertical rays that intersect the first line-path 404. Thus, the view-angle labeled V may be referred to as a vertical view-angle for the first line-path 404. It may be appreciated that while the ray drawn in FIG. 5 from the view-angle labeled V to the detector array 302 does not appear to be a vertical ray, the angled appearance is caused by the z-component of the trajectory and the ray does intersect the detector array 302 at a 90 degree angle relative to the x-direction. It may also be appreciated that the vertical view-angle for other line-paths may be different than the vertical view-angle for the first line-path 404 (e.g., as further described with respect to FIGS. 8-9). For example, the view-angle V+ may be the vertical view-angle for a second line-path.

Next, a segment 406 of the source trajectory (e.g., a segment of view-angles) that is of interest for the first line-path is defined based upon the vertical view-angle. For example, in the illustrated embodiment, the segment 406 of interest extends from the view-angle labeled V− to the view angle labeled V+ and is centered at the vertical view-angle V. In other embodiments, the segment 406 may not be centered at the vertical view-angle V. For example, a center of the segment 406 may be offset in a clockwise or counter-clockwise direction relative to the vertical view-angle V. Criteria for defining the length of the segment 406 may be further described with respect to FIG. 6, but generally is defined to provide overlap in the data, generated by respective rows, that is used to generate the projection line associated with the first line-path 404.

Next, for each of a plurality of detector rows, the trajectory of a ray intersecting the first line-path 404 is identified for respective view-angles of the segment 406. By way of example, FIG. 4 illustrates the trajectory of rays 408, 410, and 412, respectively emitted at view-angles V−, V, and V+ of the segment 406, which intersect the first line-path 404 and impinge a first row 414 of detector cells of the detector array 302. FIG. 5 illustrates the trajectory of rays 416, 418, and 420, respectively emitted at view-angles V−, V, and V+ of the segment 406, which intersect the first line-path 404 and impinge a second row 422 of detector cells of the detector array 302. In some embodiments, the first row 418 and the second row are adjacent rows.

It may be appreciated that a ray emitted while the radiation source is at a first view-angle and impinges upon the first row 414 may intersect a different point along the first line-path 404 than a ray emitted during the same view-angle which impinges upon the second row 422. By way of example, a second ray 410, emitted the while radiation source is at the vertical view-angle V and impinges the first row 414, may traverse a first point 424 and a fifth ray 418, emitted while the radiation source is at the vertical view angle V and impinges the second row 422, may traverse a second point 426 of the first line.

Further, it may be appreciated that radiation impinging upon the first row 414 may intersect a first line segment of the first line-path 404 (e.g., where the first line segment is defined as a portion of the first line-path 404 between where the first ray 408 and the third ray 412 intersect the first line-path in FIG. 4) and radiation impinging upon the second row 422 may intersect a second line segment of the first line-path 404 (e.g., where the second line segment is defined as a portion of the first line-path 404 between where the fourth ray 416 and the sixth ray 420 intersect the first line-path 404 in FIG. 5). In some embodiments, the first line segment and the second line segment are at least partially overlapping.

Referring to FIG. 6, a graph 600 is illustrated providing a projection line 602 corresponding to a portion of the first line-path 404 (e.g., corresponding to the first line segment and second line segment of the first line-path 404). The y-axis 604 represent a projection value (e.g., the greater the projection value, the more attenuation a ray experienced) and the x-axis 606 represent a z-component of the first line-path 404. Thus, the projection line 602 describes the degree of attenuation rays intersecting a portion of the first line-path 404 experienced.

The dots along the projection line 602 represent the data acquired over the segment 406 of the radiation source's trajectory, where the projection line 602 is approximated based upon the data using interpolation, extrapolation, or other estimation techniques. For example, respective black-filled dots along the projection line 602 respectively represent data corresponding to rays, emitted at different view-angles between V− and V+, which intersect the first line-path 404 and impinge the first row 414. By way of example, a first black-filled dot 608 may represent data corresponding to a first ray 408 in FIG. 4, which is emitted while the radiation source is at a first view-angle V−, that intersects the first line-path 404, and impinges the first row 414. A second black-filled dot 610 may represent data corresponding to a third ray 412 in FIG. 4, which is emitted while the radiation source is at a second view-angle V+, that intersects the first line-path 404, and impinges the first row 414. Black-filled dots between the first black-filled dot 608 and the second black-filled dot 610 may correspond to rays, emitted at view-angles between V− and V+, which respectively intersect the first line-path 404 and impinge the first row 414.

Respective whited-filled dots along the projection line 602 respectively represent data corresponding to rays, emitted at different view-angles between V− and V+, which intersect the first line-path 404 and impinge the second row 422. By way of example, a first white-filled dot 612 may represent data corresponding to a fourth ray 416 in FIG. 5, which is emitted while the radiation source is at the first view-angle V−, that intersects the first line-path 404, and impinges the second row 422. A second white-filled dot 614 may represent data corresponding to a sixth ray 420 in FIG. 5, which is emitted while the radiation source is at the second view-angle V+, that intersects the first line-path 404, and impinges the second row 422. White-filled dots between the first white-filled dot 612 and the second white-filled dot 614 may correspond to rays, emitted at view-angles between V− and V+, which intersect the first line-path 404 and impinge the second row 422.

A distance between two black dots or a distance between two white dots is representative of a distance that an object translates between a first view-angle and a next view-angle. For example, dz represents the distance that the object translated between the view-angle V− and a next view-angle (e.g., V−+1). It may be appreciated that the spacing between adjacent, similarly-colored dots may differ due to the circular nature of the rotation. For example, the distance the object translated between the view-angle V− and the next view-angle V−+1 may be different than the distance the object translated between the view-angle V−+1 and the view-angle V−+2.

A distance between the first black-dot 608, representative of the first ray 408 emitted while the radiation source was at a view-angle V−, and a first white-dot, representative of the fourth ray 416 emitted while the radiation source was at the view-angle V−, is representative of a distance that the object translates between a first row and a next row and is labeled DZ. In some embodiments, DZ is approximately equal to a row pitch of the detector array 302.

Further, it may be appreciated that in some embodiments, the length of the segment 406 (e.g., and thus the number of view-angles considered) is selected to provide some overlap between the data yielded from the first row 414 of detector cells and the data yielded from the second row 422 of detector cells. For example, in the illustrated embodiment, the length of the segment 406 was selected to provide some overlap between the black-filled dots and the white-filled dots.

Referring to FIG. 7, a binning scheme may be devised to bin (e.g., group) information represented by the projection line. Such a binning scheme may be application specific and may depend upon a desired resolution of the projection image, a desired size of image pixels of the projection images, and/or the relationship between the gantry rotation speed and speed of object translation (e.g., the larger the disparity, the more samplings that are available, and thus the smaller respective bins can be), for example.

By way of example, in the illustrated embodiment, the data is binned into bins B1-B14 having equal spatial width. That is, a first bin B1 may represent a first segment of the first line-path 404, a second bin B2 may represent a second segment of the first line-path 404, etc. (e.g., where the bins B1-B-14 are equally spaced in z so as to have an equal spatial width). In other embodiments, the spatial width of some bins may be different than the spatial width of other bins. For example, a portion of the data corresponding to rays intersecting a region of interest may be binned into more narrowly spaced bins than a portion of the data corresponding to rays intersecting a region that is not of interest (e.g., not indicative of a potential threat item).

The width of such bins may determine pixel size and/or resolution, for example. Further, the data comprised within respective bins may be utilized to determine a property of an image pixel corresponding to the bin. By way of example, the data comprised within the first bin B1 may be utilized to determine an intensity of a first image pixel (e.g., by averaging the data or applying another scheme to determine the intensity based upon the available data in the first bin B1) and the data comprised within the second bin B2 may be utilized to determine an intensity of a second image pixel. In this way, the binning scheme applied may impact one or more properties of the projection image, for example.

Figure 8:
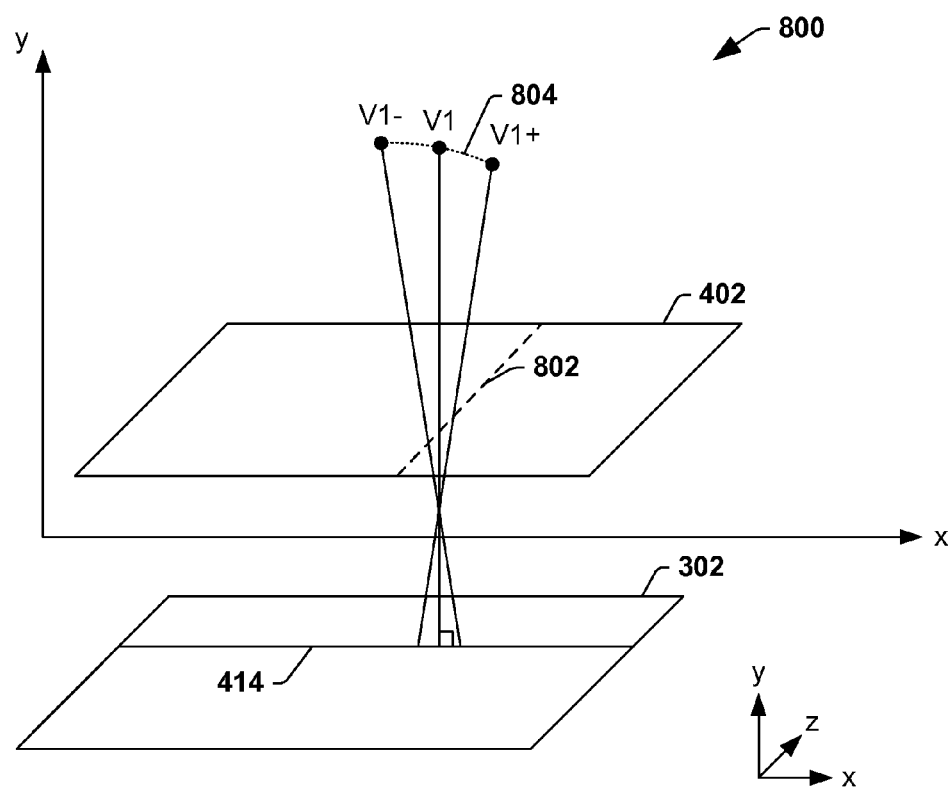
FIG. 8 is a function diagram illustrating selection of data yielded from a detector array for consideration when generating a projection image.
Figure 9:
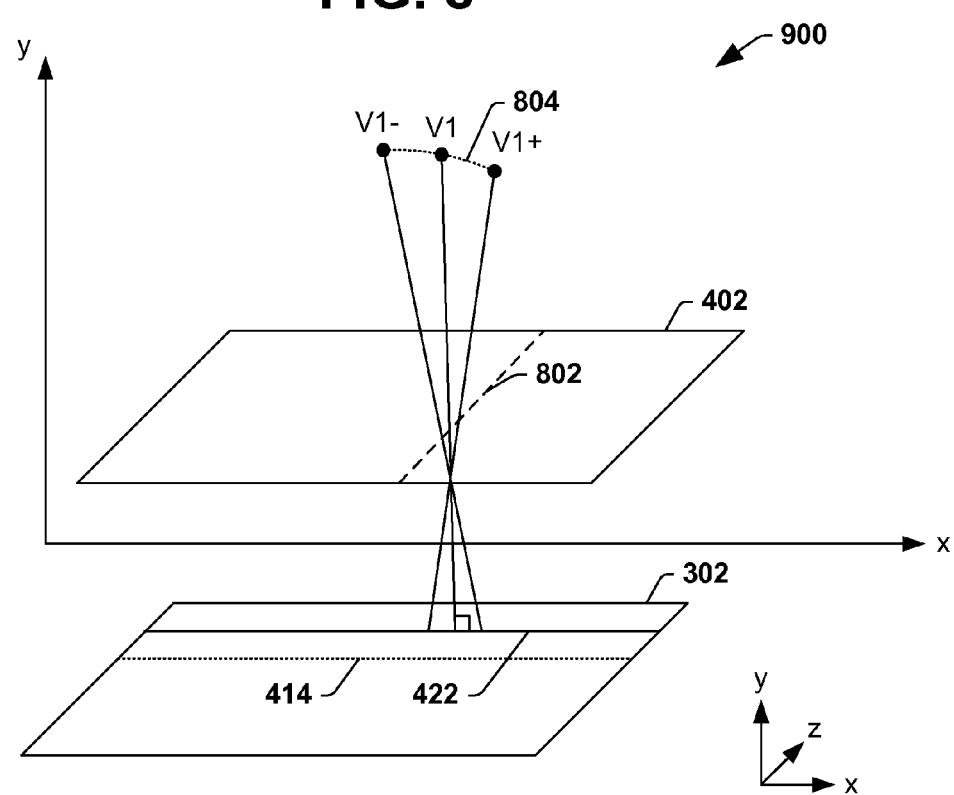
FIG. 9 is a function diagram illustrating selection of data yielded from a detector array for consideration when generating a projection image.

FIGS. 8-9 are function diagrams 800 and 900 illustrating how a second projection line, associated with a second line-path 802, may be generated using radiation emitted from a second segment 804 of a radiation source's trajectory. More particularly, a view-angle V1 that generates vertical rays intersecting the second line-path 802 may be different than a view-angle V that generates vertical rays intersecting the first line-path 404 in FIGS. 4-5. Accordingly, the segment 804 of the radiation source's trajectory used to generate the second projection line may be different than the segment 406 of the radiation source's trajectory used to generate the first projection line.

Figure 10:
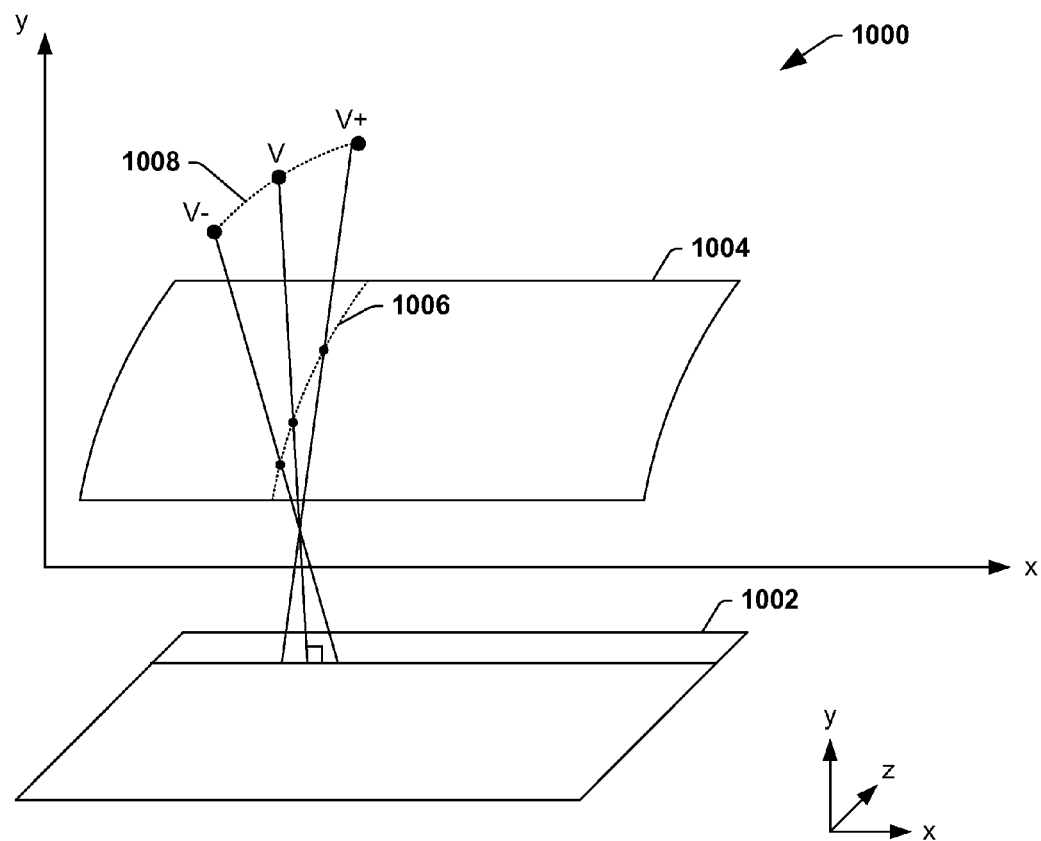
FIG. 10 is a function diagram illustrating selection of data yielded from a detector array for consideration when generating a projection image.

FIG. 10 is a function diagram 1000 illustrating how data yielded from a detector array 1002 is selected for consideration when generating a projection image that is focused on a non-planer surface 1004. In such an embodiment, a projection line selected for use in generating an image yielded from an examination represents the attenuation experienced by at least some rays intersecting a non-linear line-path 1006 spatially coincident with the surface 1004. The non-linear line-path 1006 extends in, among other directions, a direction parallel to an axis of rotation (e.g., parallel to the z-direction). A segment 1008 of a source trajectory (e.g., a segment of view-angles) is selected such that a vertical ray intersects the non-linear line-path 1006.

Figure 11:
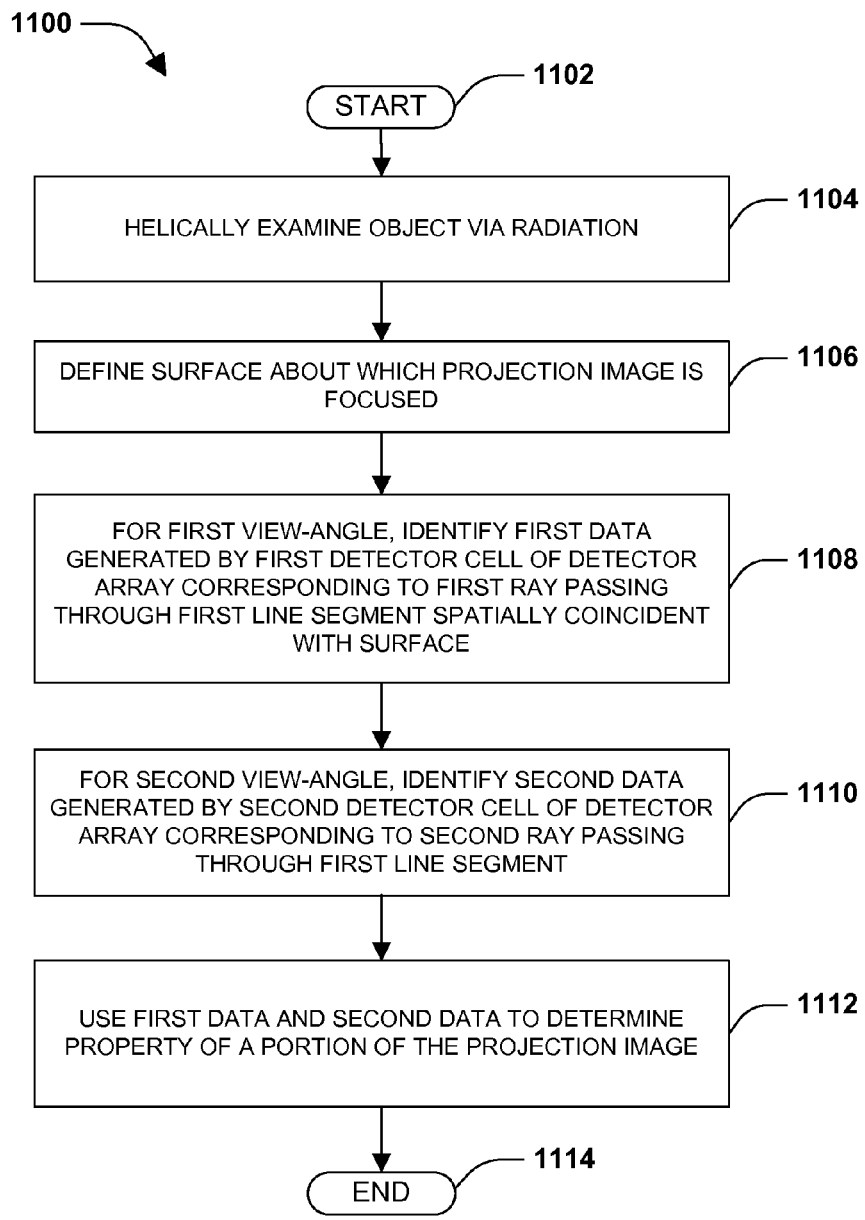
FIG. 11 is a flow diagram illustrating an example method for generating a projection image from volumetric CT data.

Referring to FIG. 11, a flow-diagram of an example method 1100 for generating a projection image from volumetric computed tomography (CT) data is provided. The method begins at 1102, and an object, such as a suitcase, is helically examined via radiation at 1104. By way of example, as described with respect to FIGS. 2-3, the radiation source and detector array may be configured to rotate within a plane about an axis of rotation while varying, along the axis of rotation, a relative position between the plane and the object. By way of example, the object may be translated in a z direction parallel to the axis of rotation while the radiation source and detector array are rotated within an x,y plane.

At 1106 in the example method 1100, a surface about which the projection image is focused is defined. The surface may be planar or non-planar and in some embodiments extends (e.g., to some degree) in a direction parallel to the axis of rotation. For example, the surface may form an arcuate shape that extends parallel to the axis of rotation.

In some embodiments, the surface is defined based upon the contents of the object under examination and can be adjusted dynamically on an object-by-object or aspect-by-aspect basis or on a view-by-view basis (e.g., a user can view a first projection image of the object and can request that the surface be changed to view a second projection image of the object, where the second image may depict the object slightly differently due to the change in the surface). By way of example, in some embodiments, the volumetric data yielded from the helical examination is analyzed to identify a potential region of interest within the object, such as a potential threat item or a region within the object having a density above a specified threshold, and a surface is defined based upon this analysis. By way of example, the surface may be defined to intersect the region of interest and/or to include at least a portion of the region of interest. In this way, a potential threat item, for example, may be in-focus in a projection image that is displayed to security personnel, for example.

At 1108 in the example method 1100, first data generated by a first detector cell of the detector array and corresponding to a first ray, emitted while the source was at a first view-angle and passing through a first line segment spatially coincident with the surface, is identified and at 1110 second data generated by a second detector cell of the detector array and corresponding to a second ray, emitted while the radiation source was at a second view-angle and passing through the first line segment, is identified. By way of example, referring to FIG. 4, the first ray may correspond to a ray identified by 408 and a second ray may correspond to a ray identified by 412. The first detector cell and the second detector cell are within a first row of cells (e.g., 414 in FIG. 4), which extends in a direction substantially perpendicular to the axis of rotation, and in some embodiments the first detector cell and the second detector cell are the same detector cell. In other embodiment, the first detector cell may be different than the second detector cell.

At 1112 in the example method 1100, the first data and the second data are used to determine a property of a portion of the projection image. By way of example, as described with respect to FIGS. 6-7, the first data (e.g., 608 in FIG. 6) and the second data (e.g., 610 in FIG. 6) may be used to determine an intensity of one or more image pixels of the projection image.

The method 1100 ends at 1114.

It is to be appreciated that while the foregoing method 1100 describes using merely one ray from respective view-angles, data respectively corresponding to multiple rays from respective view-angles may be utilized to generate a projection image. By way of example, as described with respect to FIGS. 4-7, for respective view-angles within a defined segment of the radiation source's trajectory, data corresponding to a ray impinging respective rows of the detector array may be identified. That is, for a first view-angle (e.g., V− in FIGS. 4-5), data corresponding to a first ray (e.g., first ray 408 in FIG. 4) intersecting a first line segment and impinging a first detector cell of a first row (e.g., 414 in FIG. 4) may be identified and data corresponding to a third ray (e.g., fourth ray 416 in FIG. 4) intersecting a second line segment (e.g., along a same line-path 404 as the first line segment and/or overlapping the first line segment) and impinging a third detector cell of a second row (e.g., 422 in FIG. 5) may be identified. Similarly, for a second view-angle (e.g., V+ in FIGS. 4-5), data corresponding to a second ray (e.g., third ray 412 in FIG. 4) intersecting the first line segment and impinging a second detector cell of the first row may be identified and data corresponding to a fourth ray (e.g., sixth ray 420 in FIG. 5) intersecting the second line segment and impinging a fourth detector cell of the second row maybe identified. Thus, data yielded from multiple cells and indicative of multiple rays, both vertical rays and non-vertical rays, may be used to generate a projection image.

Figure 12:
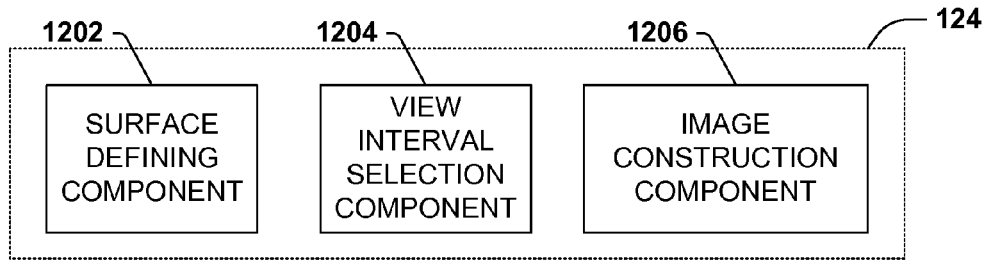
FIG. 12 is a schematic block diagram illustrating an example image generator configured to generate a projection image from volumetric CT data.

FIG. 12 illustrates a component block diagram of an example image generator 124 configured to generate a projection image using the techniques described above. The image generator comprising a surface defining component 1202, a view interval selection component 1204, and an image construction component 1206.

The surface defining component 1202 is configured to define a surface about which the projection image is to be focused. Such a surface may be defined manually (e.g., based upon user input) or may be defined automatically (e.g., based upon the contents of the object under examination), for example. Moreover, the surface may be defined statically (e.g., for a plurality of objects), defined dynamically on an object-by-object basis or aspect-by-aspect basis, or dynamically on a view-by-view basis (e.g., where an operator views a first projection image of an object in which a first surface is in focus and then views a second projection image of the same object in which a second surface is in focus).

The view-interval selection component 1204 is configured to generate a plurality of projection lines based upon the surface, where a first projection line is associated with a first line-path through the surface and a second projection line is associated with a second line-path through the surface. In some embodiments, respective line-paths extend (e.g., to some degree) in a direction parallel to an axis of rotation.

To generate a first portion of a first projection line (e.g., as shown in FIG. 6 by the black-filled dots), the view-interval selection component 1204 is configured to acquire data corresponding to rays emitted from multiple view-angles and impinging a same row of detector cells. By way of example, to generate a first portion of a first projection line associated with a first line-path, the view-interval selection component 1204 is configured to identify first data generated by a first detector cell of the detector array and corresponding to a first ray passing through the first line-path and to identify second data generated by a second detector cell of the detector array and corresponding to a second ray passing through the first line-path. The first ray is emitted while the radiation source is at a first view-angle and the second ray is emitted while the radiation source is at a second view-angle. At least one of the first ray and/or the second ray is a non-vertical ray. Moreover, the first detector cell and the second detector cell are in a same row of detector cells and, in some embodiments, may be the same cell.

The view-interval selection component 1204 is further configured to generate the projection line using data yielded from multiple rows of cells. By way of example, the view-interval selection component 1204 may combine data corresponding to a first set of rays intersecting the first line-path and impinging a first row of detector cells with data corresponding to a second set of rays interesting the first line-path and impinging a second row of detector cells to generate a projection line (e.g., as illustrated in FIG. 6). In some embodiment, the first set of rays is emitted while the radiation source is rotating through a first segment of a radiation source trajectory and the second set of rays is emitted while the radiation source is rotating through a second segment of the radiation source trajectory. In some embodiments, the first segment and the second segment are a same segment. In other embodiments, the first segment and the second segment are overlapping segments of the radiation source's trajectory.

The image construction component 1206 is configured to generate a projection image representing the object using the data identified by the view-interval selection component. By way of example, in some embodiments, the image construction component 1206 may be configured to assemble one or more projection lines generated by the view interval selection component 1204 to generate a projection image representative of the object. In other embodiments, the image construction component 1206 is configured to bin the data using one or more binning scheme as further described in FIG. 7.

Figure 13:
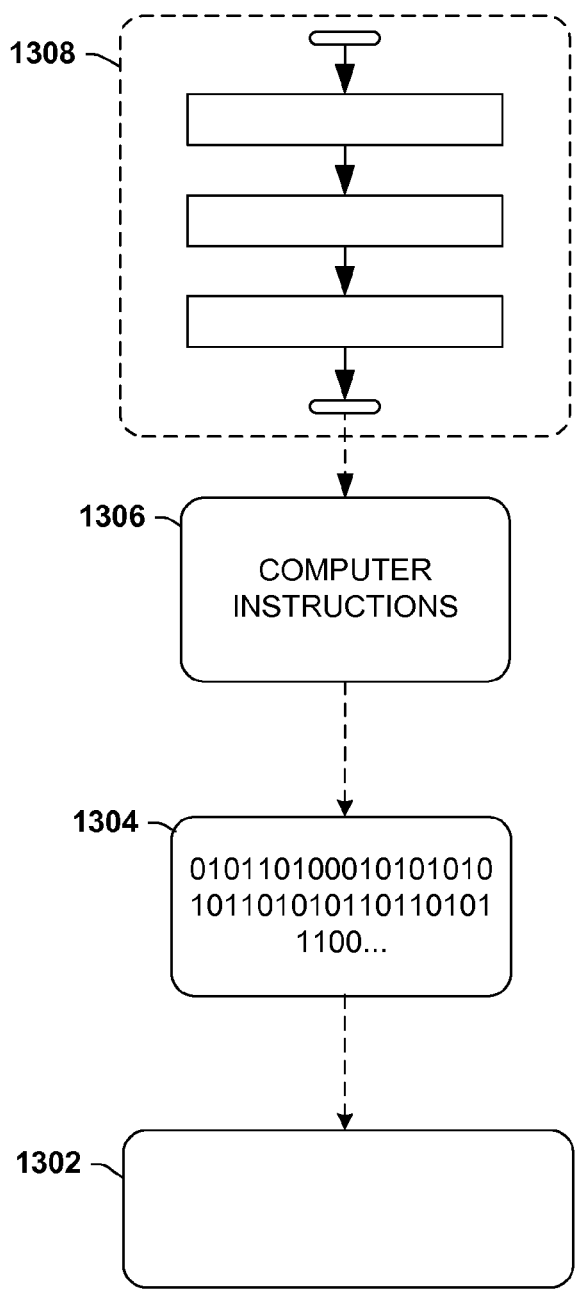
FIG. 13 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 13, wherein the implementation 1300 comprises a computer-readable medium 1302 (e.g., a flash drive, CD-R, DVD-R, application-specific integrated circuit (ASIC), field-programmable gate array (FPGA), a platter of a hard disk drive, etc.), on which is encoded computer-readable data 1304. This computer-readable data 1304 in turn comprises a set of processor-executable instructions 1306 configured to operate according to one or more of the principles set forth herein. In one such embodiment 1300, the processor-executable instructions 1306 may be configured to perform a method 1308 when executed via a processing unit, such as at least some of the example method 1100 of FIG. 11, for example. In another such embodiment, the processor-executable instructions 1306 may be configured to implement a system, such as at least some of the exemplary environment 100 of FIG. 1 and/or at least some of the image generator 124 of FIG. 12, for example. Many such computer-readable media may be devised by those of ordinary skill in the art that are configured to operate in accordance with one or more of the techniques presented herein.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B" or two different (or identical) channels or the same channel).

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application.

What is claimed is:

1. A method for generating a projection image from volumetric computed tomography (CT) data, comprising:
    helically examining an object via radiation, such that a radiation source and a detector array rotate within a plane about an axis of rotation while varying, along the axis of rotation, a relative position between the plane and the object;
    defining a surface about which the projection image is focused;
    for a first view-angle, identifying first data generated by a first detector cell of the detector array corresponding to a first ray intersecting a first line-path spatially coincident with the surface;
    for a second view-angle, identifying second data generated by a second detector cell of the detector array corresponding to a second ray intersecting the first line-path, and wherein:
        the first detector cell and second detector cell are comprised within a first row of detector cells, the first row of detector cells extending in a direction substantially perpendicular to the axis of rotation; and
    using the first data and the second data to generate the projection image.

2. The method of claim 1, the using comprising:
    using the first data and the second data to determine an intensity of a first image pixel of the projection image.

3. The method of claim 1, wherein the surface is planar.

4. The method of claim 1, wherein the first detector cell is a different detector cell than the second detector cell.

5. The method of claim 1, comprising:
    for the first view-angle, identifying third data generated by a third detector cell of the detector array corresponding to a third ray intersecting the first line-path; and
    for the second view-angle, identifying fourth data generated by a fourth detector cell of the detector array corresponding to a fourth ray intersecting the first line-path, and wherein:
        the third detector cell and fourth detector cell are comprised within a second row of detector cells.

6. The method of claim 5, the using comprising:
    generating a projection line based upon the first data, second data, third data, and fourth data.

7. The method of claim 6, wherein the projection line represents changes in attenuation of rays intersecting the first line-path.

8. The method of claim 6, comprising binning the first data, the second data, the third data, and the fourth data into two or more bins, a first bin of the two or more bins having a first spatial width that is equal to a second spatial width of a second bin of the two or more bins.

9. The method of claim 1, the defining comprising:
    identifying a region of interest within the object, and defining the surface to contact the region of interest.

10. The method of claim 9, wherein the region of interest corresponds to a potential threat item.

11. The method of claim 1, the surface extending in a direction parallel to the axis of rotation.

12. The method of claim 1, comprising:
    for a third view-angle, identifying third data generated by a third detector cell of the detector array corresponding to a third ray intersecting a second line-path, the second line-path parallel to the first line-path and spatially coincident with the surface; and
    for a fourth view-angle, identifying fourth data generated by a fourth detector cell of the detector array corresponding to a fourth ray intersecting the second line-path, and wherein:
        the third detector cell and fourth detector cell are comprised within the first row of detector cells; and
    using the third data and the fourth data to generate the projection image.

13. A computed tomography (CT) system configured to helically examine an object by rotating a radiation source and a detector array in a plane about an axis of rotation while varying a relative position between the object and the plane in a direction substantially parallel to the axis of rotation, comprising:
    a surface defining component configured to define a surface about which a projection image is focused;
    a view interval selection component configured to generate a first projection line, the generating comprising:
        for a first view-angle, identifying first data generated by a first detector cell of the detector array corresponding to a first ray intersecting a first line-path, the first line-path spatially coincident with the surface; and
        for a second view-angle, identifying second data generated by a second detector cell of the detector array corresponding to a second ray intersecting the first line-path, and wherein:
            the first detector cell and second detector cell are comprised within a first row of detector cells, the first row of cells extending in a direction substantially perpendicular to the axis of rotation; and
    an image construction component configured to generate the projection image using the first projection line.

14. The CT system of claim 13, the surface defining component configured to analyze volumetric data yielded from the examination to identify a region of interest within the object and the surface defined based upon the identified region of interest.

15. The CT system of claim 13, the first line-path being linear and extending in a direction parallel to the axis of rotation.

16. The CT system of claim 13, the first line-path being non-linear.

17. The CT system of claim 13, the view interval selection component configured to generate a second projection line, the generating a second projection line comprising:
    for a third view-angle, identifying third data generated by a third detector cell of the detector array corresponding to a third ray intersecting a second line-path, the second line-path parallel to the first line-path and spatially coincident with the surface; and for a fourth view-angle, identifying fourth data generated by a fourth detector cell of the detector array corresponding to a fourth ray intersecting the second line-path, and wherein:
the third detector cell and fourth detector cell are comprised within the first row of detector cells.

18. The CT system of claim 13, the generating comprising:
for the first view-angle, identifying third data generated by a third detector cell of the detector array corresponding to a third ray passing through the first line-path; and
for the second view-angle, identifying fourth data generated by a fourth detector cell of the detector array corresponding to a fourth ray passing through the first line-path, and wherein:
the third detector cell and fourth detector cell are comprised within a second row of detector cells.

19. The CT system of claim 13, the image construction component configured to bin data represented by the first projection line into two or more bins, a first bin of the two or more bins having a first spatial width that is equal to a second spatial width of a second bin of the two or more bins.

* * * * *